May 29, 1962 T. F. WHITE ET AL 3,036,944
BALL ELEVATOR BELTING
Filed Nov. 18, 1959
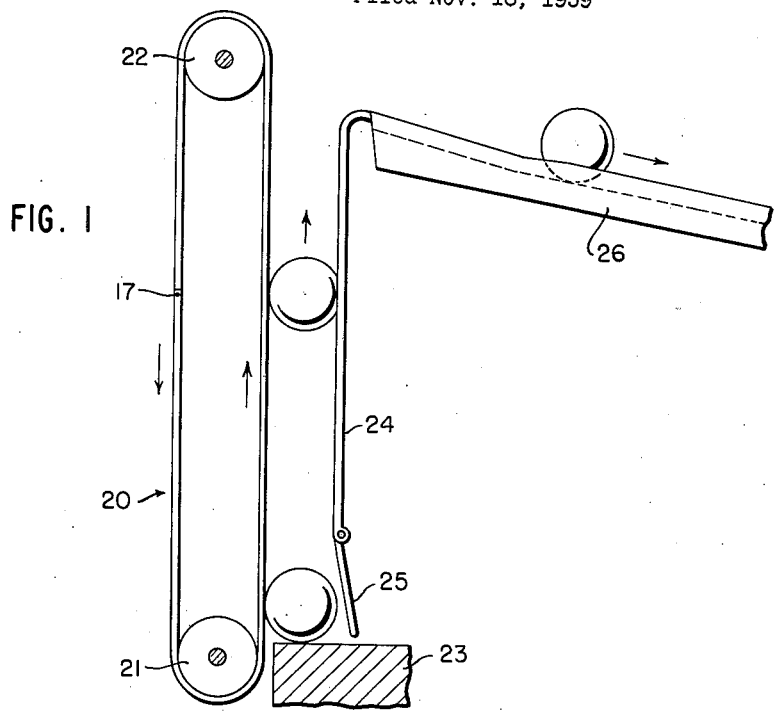
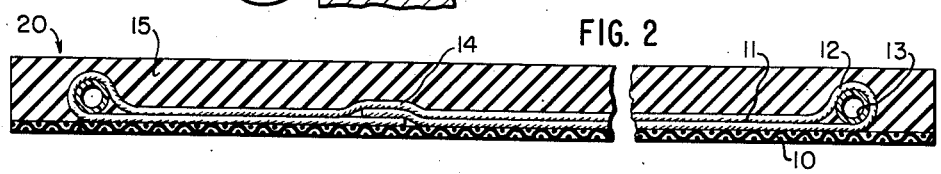
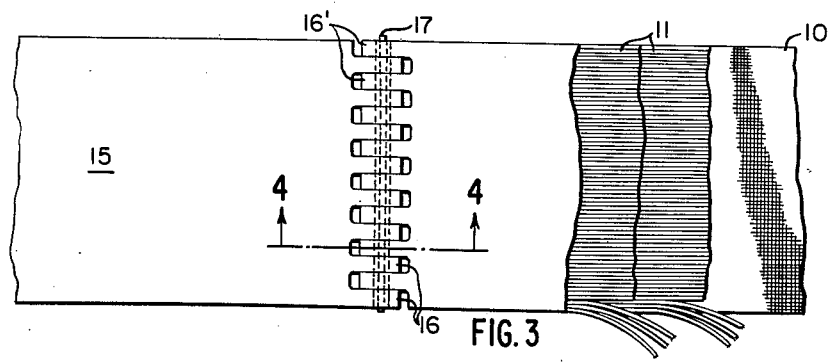
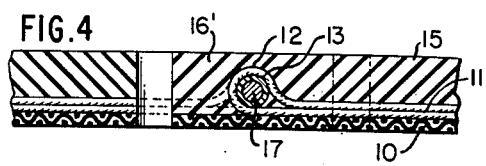
INVENTORS
Thomas F. White &
Stanley C. Swanson
by Kenway, Jenney, Witter & Hildreth
Att'ys.

United States Patent Office 3,036,944
Patented May 29, 1962

3,036,944
BALL ELEVATOR BELTING
Thomas F. White, Needham, and Stanley C. Swanson, Natick, Mass., assignors to American Biltrite Rubber Co., Inc., Chelsea, Mass., a corporation of Delaware
Filed Nov. 18, 1959, Ser. No. 853,775
1 Claim. (Cl. 154—52.1)

This invention comprises a new and improved type of ball elevating belting that may be constructed in the flat length and then converted into endless form presenting a smooth, yielding ball-engaging surface entirely free of metallic fastenings that might otherwise abrade or mar the highly-finished bowling balls handled by the belting.

Modern bowling alleys are now being generally equipped with automatic pin setting mechanism operating to return the bowling balls from the pit to the bowler. This mechanism includes an endless resilient elevator belt arranged to travel upwardly adjacent to a vertical surface. The balls are successively guided to this belt where they may be gripped between the resilient belt surface and the suitably contoured wall and rolled upwardly by the action of the belt to a suitable elevation. From that point they are released from the conveying surfaces and rolled back along a sloping track to the bowling position.

Bowling balls are expensive because they are very accurately shaped and highly finished. Accordingly, every precation bust be taken to prevent damage to the balls especially when they are privately owned. For this reason, the endless belting used in ball elevators must have a resilient, smooth and non-abrasive surface so that the surface of the balls will not be marred or scratched during the upward passage in the elevator.

This condition is so important that up to the present time most belts in use have been constructed in endless fashion since the application of available belt fasteners results in a thickened area at spliced belt ends while contact of metal fasteners with the ball surface must be prevented at all costs.

On the other hand, the use of belts constructed in endless fashion have been a source of great dissatisfaction in the maintenance of ball elevators since it has been necessary to remove the drive bearings and pulleys whenever it is desired to replace a worn out belt with a new one. Belt changeovers of endless belts result in a serious amount of "down time" in the bowling alley with consequent loss of revenue.

In accordance with the present invention we have overcome the difficulties previously encountered and provided belting of novel construction having pronounced advantages in cost and effectiveness as compared to that heretofore available. Our novel belting is characterized by an internal ply of double cord fabric folded upon itself to form loops for a splicing pin at the connected ends of the belting, the cord fabric being spliced at an intermediate point and encased within an outer elastomeric ply. Since the cord loops are united by a splicing, the full strength of the doubled cord fabric is effective to prevent stretching of the belting while contact of the splicing pin, or any other metal, is fully safe-guarded by elastomeric ply.

These and other features of the invention will be best understood and appreciated from the preferred embodiment thereof selected for purposes of illustration and shown in the accompanying drawings, in which FIG. 1 is a diagrammatic view of the ball elevator installation.

FIG. 2 is a view in longitudinal section of the belting.

FIG. 3 is a fragmentary plan view on a smaller scale, and

FIG. 4 is a view in longitudinal section on the line 4—4 of FIG. 3.

The general character of the installation will be clear from FIG. 1 in which elevator belt 20 is arranged to run vertically over pulleys 21 and 22, the lower pulley 21 being located near the pit end of the alley 23. The upward reach of the belt 20 is located sufficiently close to a vertical wall or guide 24 to engage a ball from the pit and roll it upwardly until it can be delivered to an inclined track 26 upon which it passes to the bowling position. The wall or guide 24 is provided with a mechanically operated flapper 25 which is lifted to admit one ball at a time and press it against the upwardly travelling belt 20 which carries the ball in its upward travel.

The construction of our novel belting is well shown in FIGS. 2–4 and from these figures it will be seen that the belting has an underlying wear ply 10 and this comprises a tough rubberized fabric such as heavy duck or the like. It may include several layers of fabric adhesively bonded together.

Superposed upon the wear ply 10 is a ply 11 of cord fabric. This material is doubled and folded flatwise upon itself and slotted so as to form spaced transverse loops 12 at each folded end of the cord ply. The inner ends of these plies are overlapped and spliced at an intermediate point 14 remote from the joint. It will be seen therefore that the loops 12 are united by the full strength of the intermediate double-ply portion of the cord fabric. Preferably the loops 12 are formed over a tubular bushing 13 which may be of synthetic resinous material such as nylon or Vinylite.

The cord fabric ply 11 is completely enclosed and encased in an outer ball-engaging cover ply 15 which provides a smooth tough and yielding surface extending continuously from one end to the other without a break and completely burying the loops 12 with their bushing 13 and the splice 14 beneath a substantial cushioning thickness of rubber or other suitable elastomer. The various plies of the belting are assembled successively and adhesively united to form an integral belt structure by procedure well-known to the industry.

Having completed a flat length of belting as above described, the opposite ends thereof are then slotted to form interlocking tongues 16 and 16' and in this operation the bushing 13 is cut into corresponding sections. The notched ends are then brought into engagement and registration as suggested in FIG. 3 and a splicing pin 17 of metal or plastic compound is inserted, thereby positively joining the ends and converting the flat belt to endless form.

It will be apparent that the endless belt thus provided may be readily opened into its flat condition for purposes of removal or replacement by merely withdrawing the splicing pin 17 and as readily re-established in endless form by interlocking the tongues 16—16' and re-inserting the splicing pin 17.

Having thus disclosed our invention and described in detail an illustrative embodiment thereof, we claim as new and desire to secure by Letters Patent:

Ball elevator belting comprising an underlying ply of rubberized fabric forming an exposed facing of the belting, a superposed ply of cord fabric folded flatwise upon the fabric ply and separated at its folded ends into a row of spaced transverse loops at the ends of the belting, the cord ply being bonded to the said underlying ply and having its ends overlapped and spliced at a point remote from said transverse loops, the loops being thereby connected by two complete plies of fabric, and a thick smooth ply of resilient elastomeric composition enclosing the cord fabric, concealing the loops therein and presenting a smooth yielding ball-engaging surface upon the other side of the belting from its fabric facing thereby producing a belting of uniform thickness throughout its entire length including the portion wherein the loops are concealed, and a pair of tubular bushings entirely embedded in said elastomeric composition, each bushing being enclosed by a loop of said cord fabric.

References Cited in the file of this patent

UNITED STATES PATENTS

| | | |
|---|---|---|
| 2,468,898 | Shingle | May 3, 1949 |
| 2,488,872 | Mathieu | Nov. 22, 1949 |
| 2,751,065 | Thomson | June 19, 1956 |
| 2,799,177 | Henson | July 16, 1957 |
| 2,916,136 | Combs | Dec. 8, 1959 |

FOREIGN PATENTS

| | | |
|---|---|---|
| 907,391 | Germany | Mar. 25, 1954 |